United States Patent Office 3,229,723
Patented Jan. 18, 1966

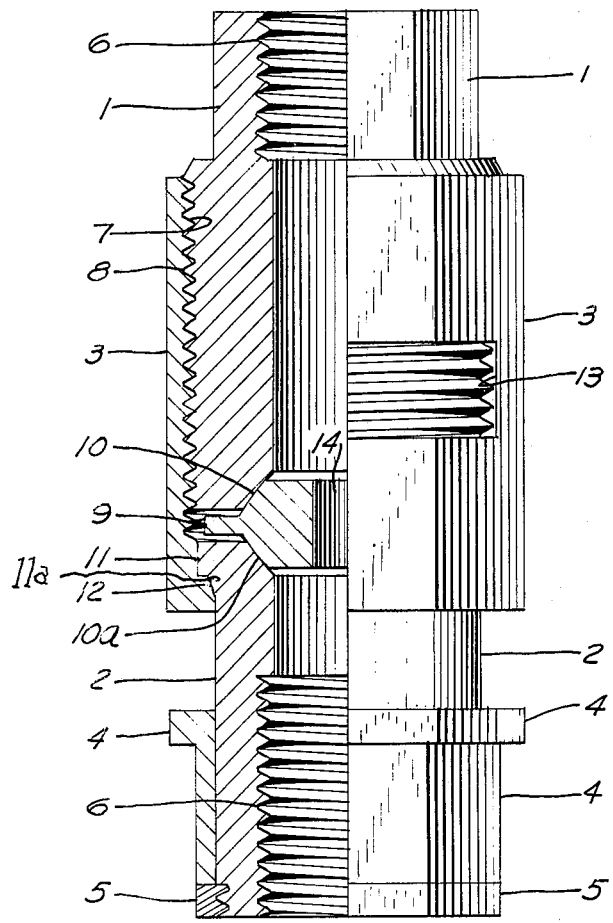

3,229,723
PIPEFITTING UNION
Thaddeus S. Janton, 2545 W. Walton St., Chicago, Ill.
Filed Jan. 23, 1963, Ser. No. 253,479
2 Claims. (Cl. 138—44)

The invention to be known as the flow control union relates to the improvement of the union, and has for its object to provide a novel union, with novel structural features, including a novel insert additional part to be known as an insert.

The primary object of invention is to conserve water, while its secondary function is to join pipe. It is to be understood that my invention is applicable to various flow lines and piping including those used connecting with industrial machinery, and which may comprise rinse tanks or the like, and where large amounts of water are used, for example, metal plating machinery and equipment. The flow control union specifically in such instance is installed on individual water or liquid lines leading into individual rinse tanks. The amount of water flow is controlled by known pressures in a main feed line (which feeds individual water lines leading into or from tanks), and by inserting the selected sized insert into unions having my novel structural features.

It is normally advisable that my inserts be made in sets, that is, in varying sizes and dimensions for my said unions. Example: for ½ inch pipe, a set of six of varying sizes would be available, ranging from a minimum diameter of $\frac{2}{16}$ of an inch and increasing in size by $\frac{1}{16}$ of an inch consecutively to largest sized diameter, for example $\frac{7}{16}$ of an inch.

It is an object of this invention to conserve water by constructing the body portions of the union so as to provide a seat and a seal for securing or mounting the flow control sealing insert. Also, to provide means of interchanging or replacing inserts without complete disassembly of union.

In describing the invention in detail, reference will be made to the accompanying drawings in which the figure is an elevational view partly in section and partly in elevation showing assembly of a union embodying my improvements and with tapered faces and having a beveled insert in normal position.

Numerals 1 and 2 are passaged body members with identical annular end faces. Numeral 3 designates the internally threaded and flanged coupling nut of the union and numeral 4 is a sleeve-like member with an integral annular shoulder which acts as a stop for nut 3. This provides for spreading or separation of the union when it is desired to change the insert or seal. Numeral 5 designates an additional internally threaded member or ring which screws onto lower body member 2, thereby holding ring member 4 in place.

Body members 1 and 2 are each provided with the standard interior screw threaded portions 6 to receive threaded end portions of a pipe. Member 1 is provided with the exterior enlarged screw threaded portion 7 to be engaged by the interior threaded portion 8 of coupling nut 3. Body member 2 has an integral annular flange 11 with adjacent beveled shoulder collar 11a for centering purposes on the exterior adapted to be engaged by flange 12 upon the interior of coupling nut 3.

The body members 1 and 2 illustrated in the figure are each provided with identical annular faces, and each thereof is provided with a shoulder or tapered or beveled annular seat which are designated as 10 and 10a respectively. Said annular shoulders 10 and 10a seat and seal annular insert, gasket or orifice disc 9 which has annular seats as illustrated.

Numeral 14 designates an opening in said gasket or insert 9 which may vary in size to meet the desired volume of flow and which limits the flow of water or other liquid as desired.

Numeral 13 is an enlarged slot opening or aperture cut into coupling nut 3, and which is of a size sufficient to permit insertion of insert or gasket 9, and this allows for selective interchanging or replacement as desired of said insert.

The gaskets or inserts 9 may be made of varying materials different from the materials of members 1 and 2, for example, the said inserts may be made of brass, graphite, plastic or bronze or similar soft or yieldable material. The sealing insert or gaskets 9 which are contacted by the opposed end faces of body members 1 and 2 may vary in size, degree of projection, in curvature and in cross-sectional shape in a wide range, and which in each instance form an effective seal between body members 1 and 2.

In one form, illustrated in the drawing, the insert 9 has an integral peripheral flange which is normally impinged between the end faces of body members 1 and 2.

My novel construction provides important advantages in providing for relatively quick and easy removal and replacement of inserts 9, which replacement may be necessitated, either by substantial wear and deterioration or by a desire to decrease or increase the volume of liquid flow through said pipes in which my said device is mounted. This avoids the dismounting and disassembly of the connected pipes and fittings which thereby eliminates substantial labor and expense.

I claim:
1. A flow controlling pipe union comprising
   first and second body members having internal threads for connection to standard pipe sections,
   each said body member having a seat,
   a removable orifice disc having annular seats on its opposite faces,
   the seats on said disc being engaged by the seats on said body members to provide a fluid tight seal,
   a coupling nut having screw-threaded engagement with the outer surface of said first body member,
   said coupling nut being provided with a slot of sufficient size to allow insertion of said orifice disc therethrough,
   said coupling nut having an annular shoulder on one end which engages an annular shoulder on said second body member,
   said second body member being provided with a stop member,
   said stop member providing an abutment for said coupling nut such that when said coupling nut is turned until it abuts said stop member, said slot will be aligned for insertion or removal of said orifice disc.
2. A pipe union substantially as recited in claim 1 in which said stop member includes a slidable annular sleeve, and a ring threaded on the lower portion of said second body member.

References Cited by the Examiner
UNITED STATES PATENTS

| 624,569 | 5/1899 | Stover | 138—46 |
| 1,953,110 | 4/1934 | Holtane | 138—44 |
| 2,661,768 | 12/1953 | Novak | 138—44 |

FOREIGN PATENTS 1,550   10/1877   Germany.

LAVERNE D. GEIGER, *Primary Examiner.*
CARL W. TOMLIN, LEWIS J. LENNY, *Examiners.*
R. GIANGIORGI, C. HOUCK, *Assistant Examiners.*